US012370717B2

United States Patent
Rodriguez Garcia et al.

(10) Patent No.: US 12,370,717 B2
(45) Date of Patent: Jul. 29, 2025

(54) METHOD AND SYSTEM FOR PRODUCING SLABS, TILES OR SHEETS OF ARTIFICIAL STONE WITH A WIDE VEIN EFFECT

(71) Applicant: COSENTINO RESEARCH & DEVELOPMENT S.L., Almeria (ES)

(72) Inventors: Salvador Cristobal Rodriguez Garcia, Almeria (ES); Carmen Maria Montero Perez, Almeria (ES)

(73) Assignee: COSENTINO RESEARCH & DEVELOPMENT S.L., Almería (ES)

( * ) Notice: Subject to any disclaimer, the term of this patent is extended or adjusted under 35 U.S.C. 154(b) by 0 days.

(21) Appl. No.: 18/398,836

(22) Filed: Dec. 28, 2023

(65) Prior Publication Data

US 2024/0131745 A1    Apr. 25, 2024

Related U.S. Application Data

(63) Continuation of application No. 16/766,528, filed as application No. PCT/EP2018/082136 on Nov. 21, 2018, now Pat. No. 11,897,164.

(30) Foreign Application Priority Data

Nov. 22, 2017    (ES) ............... ES201731349

(51) Int. Cl.
*B28B 1/00*    (2006.01)
*B28B 3/02*    (2006.01)
(Continued)

(52) U.S. Cl.
CPC .............. *B28B 1/005* (2013.01); *B28B 1/008* (2013.01); *B28B 3/02* (2013.01); *B28B 13/02* (2013.01);
(Continued)

(58) Field of Classification Search
CPC ....... B28B 1/005; B28B 1/008; B28B 13/026; B28B 3/02; B28B 1/001; B28B 13/02;
(Continued)

(56) References Cited

U.S. PATENT DOCUMENTS 5,741,457 A * 4/1998 Iida .................. B29C 31/10
425/150
9,186,819 B1   11/2015 Grzeskowiak, II et al.
(Continued)

FOREIGN PATENT DOCUMENTS

CH    190667 A    5/1937
CH    666223 A5   7/1988
(Continued)

OTHER PUBLICATIONS

Machine English translation of Deng et al. (CN-107263673-B) (Year: 2020).*
Machine English translation of CH-666223-A5 (Year: 1988).

*Primary Examiner* — Jeffrey M Wollschlager
*Assistant Examiner* — Edgaredmanuel Troche
(74) *Attorney, Agent, or Firm* — Finnegan, Henderson, Farabow, Garrett & Dunner, LLP

(57) ABSTRACT

Provided herein are a method and a system for producing slabs, tiles or sheets of artificial stone, with a wide vein effect, comprising inorganic particles of different sizes and hardened binders, and which simulate the appearance of natural stone.

17 Claims, 9 Drawing Sheets

(51) Int. Cl.
*B28B 13/02* (2006.01)
*B44F 9/04* (2006.01)
*C04B 26/00* (2006.01)
*C04B 32/00* (2006.01)
*C04B 111/54* (2006.01)

(52) U.S. Cl.
CPC ........ B28B 13/0215 (2013.01); B28B 13/023 (2013.01); B28B 13/026 (2013.01); B44F 9/04 (2013.01); C04B 26/00 (2013.01); C04B 32/00 (2013.01); *C04B 2111/545* (2013.01)

(58) Field of Classification Search
CPC ....... B28B 13/0295; B28B 1/004; B28B 1/29; B28B 1/30; B44F 9/04; C04B 2111/54; C04B 2111/545; C04B 26/06; C04B 26/18; C04B 28/04; C04B 32/00; B05C 19/04; B05C 19/06; B05C 1/027; B05D 1/34; B29C 31/04; B29C 13/026; B29C 45/27; B29C 64/209; B29C 31/06; B29C 2037/903; B29C 39/24; B29C 41/36; B29C 2043/5875; B22F 12/50; B22F 12/53; B22F 12/55; B30B 15/308
USPC .... 222/57, 58, 371, 415; 425/145, 148, 150; 264/40.1, 40.4; 141/9
See application file for complete search history.

(56) References Cited

U.S. PATENT DOCUMENTS

| | | | | |
|---|---|---|---|---|
| 2004/0032044 | A1* | 2/2004 | Toncelli | B01F 35/81 264/73 |
| 2005/0013991 | A1* | 1/2005 | Yang | C04B 33/14 428/210 |
| 2006/0237088 | A1* | 10/2006 | Morey | B28B 1/005 425/207 |
| 2008/0315448 | A1* | 12/2008 | Cruz | B29C 67/244 264/71 |
| 2009/0316515 | A1* | 12/2009 | Morey | B28B 13/022 366/8 |
| 2017/0355101 | A1* | 12/2017 | Toncelli | B28B 13/0295 |
| 2018/0126673 | A1* | 5/2018 | Sanchis Brines | B29C 67/244 |
| 2019/0168443 | A1* | 6/2019 | Wohlgemuth | B33Y 40/00 |

FOREIGN PATENT DOCUMENTS

| | | | |
|---|---|---|---|
| CN | 107263673 B | * 9/2020 | ........ B28B 13/0235 |
| DE | 202010000882 U1 | 5/2010 | |
| EP | D629478 A1 | 12/1994 | |
| EP | 1905749 A2 | 4/2008 | |
| EP | 1930142 A2 | 6/2008 | |
| EP | 2944443 A1 | 11/2015 | |
| EP | 3095768 A1 | 11/2016 | |
| GB | 2302817 A | 2/1997 | |
| WO | 2005090034 A1 | 9/2005 | |
| WO | 2016123433 A | 8/2016 | |

* cited by examiner

METHOD AND SYSTEM FOR PRODUCING SLABS, TILES OR SHEETS OF ARTIFICIAL STONE WITH A WIDE VEIN EFFECT

This application is a continuation of application Ser. No. 16/766,528, filed on May 22, 2020, which is a national stage filing under 35 U.S.C. § 371 of International Application No. PCT/EP2018/082136, filed Nov. 21, 2018, which claims priority to Spanish Patent Application No. ES201731349, filed Nov. 22, 2017. The contents of these applications are each incorporated herein by reference in their entirety.

FIELD OF THE INVENTION

The present invention relates to a method and a system for producing slabs, tiles or sheets of artificial stone, with a wide vein effect, which comprise inorganic particles of different sizes and hardened binders, and which simulate the appearance that some types of natural stone have.

BACKGROUND OF THE INVENTION

In construction and decoration, it is common to use slabs of natural stone, such as for example, slabs of marble, granite, steatite or travertine, due to the qualities thereof, both in terms of aesthetics and high strength.

Nevertheless, natural stone can be an expensive and costly raw material, due to the difficulties in extracting and processing it, and certain types have limited availability; furthermore, it has limitations as far as the colouring thereof, which is reduced to the types found in nature, and as far as the reduced consistency of the colour patterns, since these are randomly generated in nature. Likewise, natural stone has limitations in features such as the low strength against abrasion or chemical attacks (i.e. acids) thereof, or the high susceptibility to staining thereof.

In order to respond to this problem, industrial manufacturing of slabs of artificial stone which imitate the aesthetics of natural stone slabs is common. Generally, they are obtained by means of mixing inorganic particles, normally originating from stones, of different sizes, mixed with binders that can harden by means of different methods; depending on the binder used, it can be necessary to add catalysts or accelerators in order to achieve hardening, which, for example, is the case for certain resins. To said mixtures, additives can also be added such as colourants, depending on the final aesthetics desired. The proportion by weight of binder in the mixture tends to be 5-15%, and of inorganic particles 70-95%, with respect to the total mixture; due to these composition ranges, the mixture of inorganic particles and binder before hardening acquires a texture similar to wet sand, with a certain stickiness and a high tendency to form aggregates and clump together, After the mixing and homogenisation, the mixture of particles and liquid (unhardened) binder is transported from the mixers to a distributor, which discharges the mixture on a rectangular mould. The mould, in the base and cover thereof, is made of sheets of Kraft paper or elastomer, while the sides of the mould are usually a frame made of metal or elastomer. Once the desired amount of mixture has been deposited on the base and inside the frame of the mould, the mass is covered with a cover (sheet of paper or elastomer) and is transported to a vacuum pressing station with vibration (vacuum vibro-compaction), in order to compact and extract as much air as possible from the mixture, which will then be subjected to the treatment necessary to harden the binder and obtain a slab of artificial stone with sufficient hardness. For example, in the case of the binder being a resin, the compacted mixture is taken to a curing oven, wherein the resin is hardened at a temperature that tends to vary between 70-120° C., normally with assistance from the catalyst initially added to the mixture. After the curing, the hardened mass is cooled, cut and calibrated to the required dimensions, and is polished on at least one of the two larger surfaces thereof (normally the upper surface).

Nevertheless, these slabs of artificial stone have the drawback that the difference with the slabs of natural stone can be appreciated aesthetically, resulting in an artificial appearance. This is mainly due to the fact that the inorganic particles, even when they have different colouring, are distributed more or less regularly throughout all the material, lacking the typical veins of materials such as, for example, marble (calacatta, marquina, statuary), some types of granite, steatite or travertine.

With the object of imitating these colour patterns that are found in natural stones, different techniques for decorating the slabs of artificial stone have been developed. Such techniques include the application of pigments or colourants, solid or liquid, in different steps of the process, either in the liquid resin, superficially on the unhardened mixture layer, or inside of that mixture. The techniques used are diverse, and include for example the projection of pigment onto the uncured mass, in the distributor or already deposited in the mould (see, for example, EP1905749 B1 and US20040032044 A1), or the combination of layers of mixtures including different compositions and/or colourants (see, for example, U.S. Pat. No. 9,186,819 B1 or EP2944443 A1).

Creating effects in these types of materials simulating wide, irregular veins, particularly veins having regions with a width greater than one centimetre of thickness in the finished product, and that extend along all the thickness of the slab, of the type found in natural marbles, continues to be, however, a difficult and expensive task. The methods described to this end in the state of the art require working with at least two different templates, which have gap areas and branches or islands between these areas (see, for example, WO2016123433 A1 and EP3095768 A1). Apart from two templates, two distributors are also necessary, and all the elements must be positioned and removed in a synchronised manner, which requires high investment and a large space in the production lines. The first template is used to make a series of cavities or trenches in a first mixture discharged by a distributor onto that template. Thus, the gaps of the first template are filled by the first mixture, and cavities are created corresponding to the branches or islands in that template. The cavities or trenches created in the first mixture are filled afterwards with a second mixture, with a different composition and/or colouration, discharged by a second distributor and through a second template. For example, in WO2016123433 A1, this step of filling the cavities is performed with a second template that is complementary to the first one, which has islands in the positions wherein the first template had gaps, covering the first template in these areas, both on the upper and side surfaces thereof, and gaps wherein the first template had islands, such that the gaps can be filled with the second mixture. Once the cavities have been filled, the second template is removed and the combination of first and second mixtures is covered with the cover of the mould and the usual steps of compacting, hardening and finishing are then performed. In turn, in EP3095768A1 the step of filling the cavities is carried out with a second template, in this case a flat template, which has material in the positions wherein the first template had gaps, covering the surface of the first mixture in these areas, and gaps, coinciding with the islands of the first template, such that the gaps can be filled with the second mixture. In both cases, the second mixture is distributed throughout all the width and length of the first template, for which reason only a portion of the mixture enters the gaps present in the templates, the rest of the mixture staying on the solid portions of the templates; this excess material must be cleaned, creating significant shrinkage, or there is a risk of it randomly falling onto areas of the first mixture, contaminating it and creating defects in the articles produced. Furthermore, upon discharging the second mixture through the second template, when the second template is removed, the first and second mixtures of inorganic particles and binder are mixed together in the borders of the cavities, leading to a low definition of the obtained veins, i.e. the borders of the vein are little defined, or blurry.

Document EP3095768A1 additionally describes the formation of fine veins, by applying an impregnation material on small cavities (depth of 3/10-4/10 of the total thickness of the artificial stone) created previously in the surface of the mixture of inorganic particles and resin, corresponding to fine veins, by means of an automated arm provided with a projection head on one of the ends thereof. The impregnation mixture, in order for it to be able to be projected onto the cavities, must consist of a fluid that can be hardened, which must not comprise any type of ground particles, or at most it can comprise micronised particles, with a grain size between 0,1-750 micrometres, and never more than 750 micrometres. After the small cavities have been impregnated, they collapse and close, for example, by passing a roller over the surface. After this method, the normal way of hardening the binder is then performed and a slab of artificial stone is obtained, only with fine veins, or with fine, wide veins wherein the wide veins have been produced according to that described in the previous paragraph.

According to the aforementioned, the methods of the state of the art for obtaining slabs of artificial stone have several drawbacks to be solved, such as the production cost due to the machinery involved, or the defects that the obtained material in many cases shows, due to low definition of the obtained veins, or due to the contamination of the first mixture by the portions of the second mixture that have undesirably fallen thereon.

Therefore, there is the need to develop an alternative method that enables slabs of artificial stone to be efficiently obtained with a wide vein effect, with less shrinkage and better quality of the final product, and generally, that does not worsen the problems of the methods known until now.

SUMMARY OF THE INVENTION

The present invention solves the drawbacks of the methods of the state of the art, providing a method for the production of slabs, tiles or sheets of artificial stone with a vein effect, particularly wide veins, which comprise inorganic particles of different sizes and a hardened binder, and which simulate the appearance that some types of natural stone have, as well as a system for filling cavities that is suitable and enables said method to be carried out.

The method and the filling system within the field of the invention are particularly suitable for producing wide veins, with regions of the vein with a width of at least 0.5 cm, or at least 1 cm, in the product obtained after the compacting and hardening steps.

According to a first aspect of the invention, it therefore relates to a method for manufacturing slabs, tiles or sheets of artificial stone with a vein effect, preferably wide veins; said method comprises the following steps:

a) a template is positioned on a surface, the template comprising gaps and islands, which are preferably irregular, wherein the islands correspond to at least one vein of the article to be manufactured;

b) a first mixture is discharged, comprising inorganic particles and an unhardened binder, onto the template, by means of a first distributor device, such that said first mixture rests on the surface and fills at least a portion of the gaps of the template;

c) the template is removed, obtaining a layer of the first mixture with cavities in said layer, defined by the positions of the islands of the template;

d) a second mixture is discharged, which comprises inorganic particles and an unhardened binder, in order to fill at least a portion of the cavities in the layer of the first mixture with said second mixture;

e) the resulting layer of the combination of first and second mixtures is compacted, preferably by vibration and/or compaction and/or vacuum, and a hardening process is carried out, in order to obtain the slab, tile or sheet of artificial stone with a vein effect, preferably wide veins;

wherein in step d) said second mixture is discharged in a localised manner on the cavities in the layer of the first mixture, by means of a second distributor device, which comprises a collector, the bottom opening of which has, in at least one direction, a width less than or equal to the maximum width of the cavities, moving said second device along the cavities, filling at least a portion of said cavities with the second mixture.

In step b) of the method, the first mixture is discharged by filling at least a portion of the gaps of the template, preferably at least 30%, or at least 40%, or at least 50% of the total volume of the gaps in that template.

In step d) of the method, the second mixture fills at least a portion of the cavities in the layer of the first mixture, preferably at least 50%, or at least 65%, or at least 80% of the volume of all the cavities in said layer of the first mixture. Preferably, each of the cavities present in the layer of the first mixture is filled, at least 50%, or at least 80% of the volume thereof, with the second mixture.

Another aspect of the present invention relates to slabs, tiles or sheets of artificial stone with a wide vein effect, which have been obtained by means of the previously described method. In another aspect, the invention relates to the use of the obtained slabs, tiles or sheets of artificial stone with a wide vein effect, as material for construction or decoration, for manufacturing counters, sinks, shower trays, wall or floor coverings, stairs or similar.

Furthermore, according to an additional aspect, the present invention relates to a system suitable for manufacturing a slab, tile or sheet of artificial stone with a wide vein effect, which fills, with a filling mixture, which can comprise inorganic particles and unhardened binder, cavities, preferably irregular, present in a first substrate layer, a system comprising a distributor device assembled in a robotic device, characterised in that the distributor device comprises:

i. a hopper for storing the filling material, wherein the hopper has an top opening and another bottom one, ii. a conveyor belt located underneath the bottom opening of the hopper, and iii. a collector, with a top opening and another bottom one, which collects the filling mixture discharged from the conveyor belt and deposits it in the substrate cavities to be filled. The collector preferably has a bottom opening with a width less than or equal to, at least in one direction, the maximum width of the cavities to be filled.

Although the system for filling cavities in a substrate, according to this aspect of the invention, is particularly suitable for producing slabs of artificial stone made up of inorganic particles and hardened binder, the use thereof is not limited to this application, and this system could also be used in processes for producing other materials, such as ceramic materials, wherein cavities are created in a substrate and are to be filled in a localised manner with a filling mixture with a tendency to clump together.

The terms relating to position, such as top, bottom, above, below etc. used in the description relate to the position in height relative to the ground or to the surface whereon the production line will carry out the method of the invention or comprising the system or device of the invention will be installed. In the same manner, the terms horizontal or vertical relate to the directions as they are naturally understood, that is, horizontal is the direction essentially parallel to the ground plane, and vertical is the direction perpendicular to said plane.

DESCRIPTION OF THE FIGURES

Below, the figures and the elements thereof are described; said figures are illustrative with the aim of facilitate understanding the invention, nevertheless, under no circumstance they should be interpreted in a limiting manner regarding the scope of the invention.

DETAILED DESCRIPTION OF THE INVENTION

Figure 1:
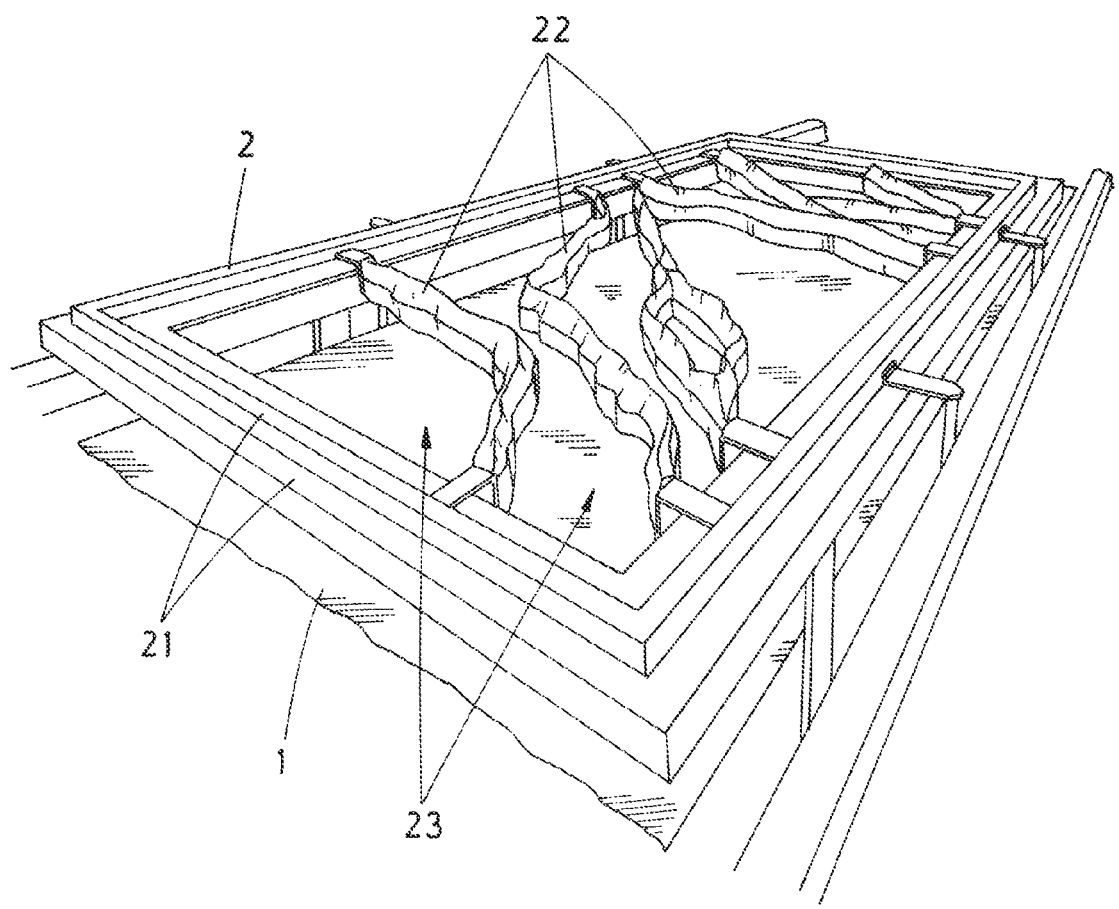
FIG. 1—Exploded perspective view of the elements of the method of the invention, with the template (2) elevated above the surface (1): surface (1) with optional Kraft paper, template (2), optional frame (21) comprised in the template (2), islands (22) of the template (2) and gaps (23) of the template (2).
Figure 2:
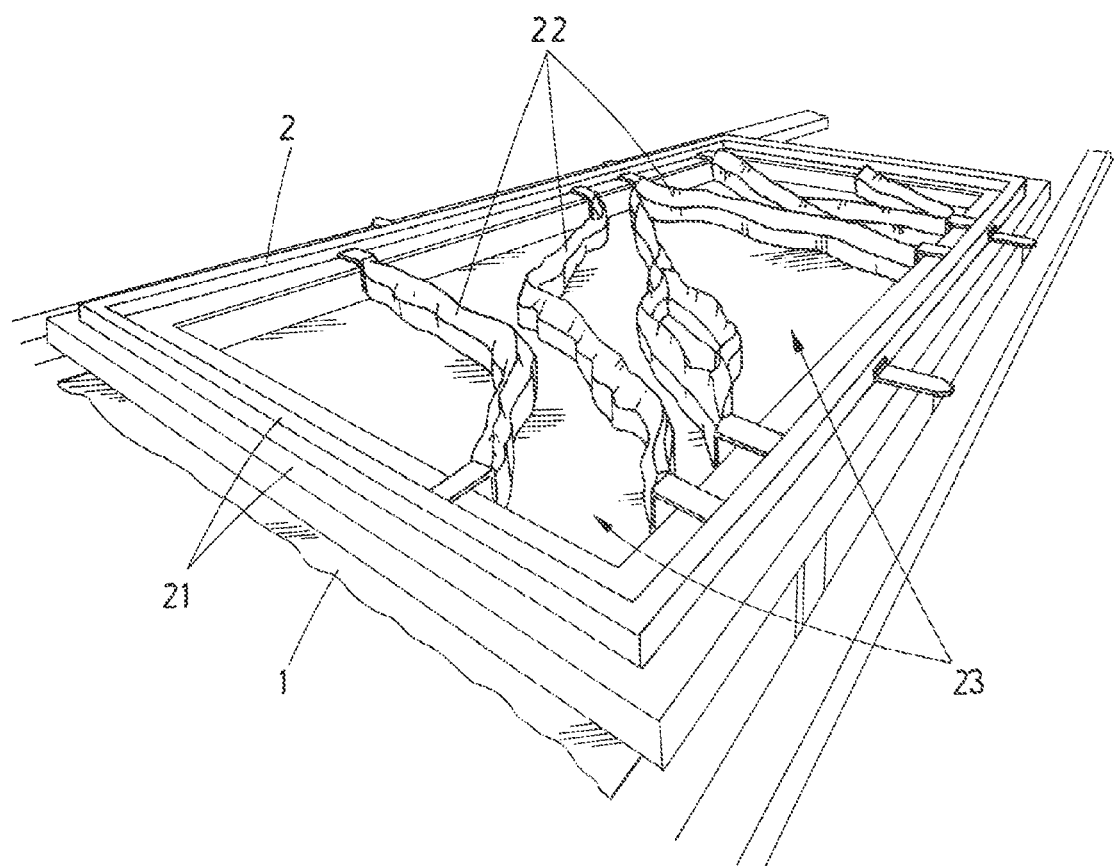
FIG. 2—Assembled perspective view of the elements of the method of the invention, corresponding to step a), with the template (2) positioned on the surface (1) and in contact therewith: surface (1) with optional Kraft paper, template (2) with optional frame (21), islands (22) of the template (2) and gaps (23) of the template (2).

Throughout this description, and in order to facilitate the understanding of the invention, reference will be made to the numbered elements in FIGS. 1-10, by way of illustration, without intention of this implying any limitation or restriction of the field covered by the claims or the scope thereof.

The present invention relates to a method and a system for producing slabs, tiles or sheets of artificial stone, with a vein effect, particularly wide veins, which comprise inorganic particles of different sizes and a hardened binder, and which simulate the appearance that some types of natural stone have.

A first aspect of the invention relates to a method for manufacturing slabs, tiles or sheets of artificial stone with a wide vein effect; said method comprises the following steps:
  a) on a surface (1) a template (2) is positioned, which comprises gaps (23) and islands (22), preferably irregular, which correspond to at least one vein of the article to be manufactured;
  b) a first mixture (3) is discharged, which comprises inorganic particles and an unhardened binder, onto the template (2), by means of a first distributor device, such that said first mixture (3) rests on the surface (1) and fills at least a portion of the gaps (23) of the template (2);
  c) the template (2) is removed, obtaining a layer of the first mixture (3) with cavities (5) in said layer, defined by the positions of the islands (22) of the template (2)
  d) a second mixture (7) is discharged, which comprises inorganic particles and an unhardened binder, in order to fill at least a portion of the cavities (5) in the layer of the first mixture (3) with said second mixture (7);

e) the resulting layer of the combination of first and second mixtures is compacted, preferably by vibration and/or compaction and/or vacuum, and a hardening process is carried out, in order to obtain the slab, tile or sheet of artificial stone with a vein effect, preferably wide veins;

wherein in step d) said second mixture (7) is discharged in a localised manner on the cavities (5) in the layer of the first mixture (3), by means of a second distributor device, which comprises a collector (6), the bottom opening (62) of which has, in at least one direction, a width (d) less than or equal to the maximum width of the cavities (5), said second device moving along at least a portion of the cavities (5), filling at least partially a portion of said cavities (5) with the second mixture (7).

In a particular embodiment of the method, and as can be seen in FIGS. 1-5, the template (2) comprises a frame (21) encompassing the islands (22) and the gaps (23), with a size corresponding to the slab, tile or sheet of artificial stone to be manufactured, or larger. Alternatively, or additionally, the frame (21) can be a separate element from the rest of the template, which is positioned on or removed from the surface (1) before, after or at the same time as the rest of the template.

The latter method enables the slabs, tiles or sheets of artificial stone to be obtained with a wide vein effect filled with a second mixture (7) different from the first mixture (3) defining the substrate of the slab, tile or sheet, veins which extend along a good portion of the length and/or width of the obtained article, and preferably through all or a good portion of the thickness of the article, for example, more than 50% of the thickness, with a good definition in the borders thereof.

Both the first mixture (3) and the second mixture (7) comprise inorganic particles; said inorganic particles may proceed from natural or artificial materials, and can be obtained for example by means of crushing and/or grinding, in order to obtain different grain sizes. Nowadays, inorganic particles can also be acquired from specialised companies that sell them already dried and fractured according to the granulometry thereof. Inorganic particles can be obtained starting from, for example, but not limited to, materials such as marble, dolomite, quartz (both opaque and clear), silica, glass, cristobalite, granite, porphyry, quarzite, silica sand, albite, basalt, ceramic, etc. In one same mixture, inorganic particles proceeding from a single material, or a mixture of particles from several sources, can be used. According to one particular embodiment, the inorganic particles comprise quartz particles, or in the mixture quartz particles are incorporated. The inorganic particles will have a granulometric distribution, that is, they will have a particle size that is in an interval. The inorganic particles comprised in the article made of artificial stone can be classified with respect to the granulometry thereof intos "aggregted" or "micronised" materials (dusts), The aggregates are the portion with a larger particle size, usually above 0.5 mm and which can reach several millimetres. The micronised materials are in turn comprised by finely divided particles, with a particle size that can go from 1 nanometre and up to 750 micrometres. The granulometry of both first and second mixtures can be similar or different, and the particle size will be generally found in a range of 1 nanometre to 20 mm, preferably in a range of 0,1 micrometres to 10 mm. According to other particular embodiments, the particle size will be in a range of 0,2 to 5 mm, or from 0,3 to 3 mm. Both first and second mixtures preferably incorporate a combination of inorganic particles combining aggregated and micronised ones. The inorganic particles will make up, generally, between 70 and 95% by weight of the respective mixture, preferably between 85% and 95%; the percentages, sizes and sources can be similar or different between one mixture and another.

The size distribution of the inorganic particles comprised in the first (3) or second (7) mixture can be determined by usual methods in the field of the invention. For example, this particle size distribution can be determined according to ASTM 0136-14 and ASTM 0117-17.

The mixtures, both the first and the second ones, likewise comprise at least one unhardened binder, which is hardenablea (or curable), in an amount between 5 and 30% by weight, preferably 5 to 15% by weight, of binder with respect to the total weight of the mixture; said binder (also called binding agent) will serve to achieve an irreversible cohesion and adherence between the inorganic particles of the mixture, and finally providing a hardened slab, the or sheet. Said binder can be any binder that after being hardened, finally provides a sufficient hardness for the obtained slab, tile or sheet, achieving sufficient cohesion and adherence between the inorganic particles. There are numerous binders known in the state of the art, any of which can be used, for example. Organic resins are especially suitable for the present invention, such as polyester resins, but other types of binder can also be applied, such as for example inorganic binders such as cement, for example Portland cement. For example, the resin that can be used in the frame of the present invention can be a heat cured resin, i.e. which is cured, hardened, by means of the effects of heat, for example a treatment between 70 and 120° C. Some examples of heat cured resins are, but are not limited to, an unsaturated polyester resin, a methacrylate resin, an epoxy resin, vinyl resins, etc. Usually, in order to achieve the curing of this type of resin in a viable time it is necessary to add a suitable catalyst and/or accelerator, normally in a proportion between 0,1-5% by weight with respect to the weight of the binder, which will be incorporated into the corresponding mixture in a mixing step, prior to the manufacturing of the slabs, tiles or sheets of artificial stone. The binder used in any of the mixtures can be different or the same between them. Preferably, it would have a similar composition in the first and second mixtures, with the aim of hindering incompatibilities and optimising the adhesion between the materials, throughout all of the slab, tile or sheet.

In any of the mixtures other additives can be added. The most common type of additive is the use of colourants, normally metal oxides, in order to provide the final slab, tile or sheet with the desired colouring. It can be a mixture of colourants or just one. The amount of colourant used depends on the colourant used and the intensity of the colouring desired in the final product, but generally it will be between 0,1-10%, preferably between 1-5% by weight of the weight of the binder. Colourant can be used in both mixtures, or only in one of them. If colourant is used in both mixtures, that is, the first and second mixtures, the colourant or mixture of colourants, or rather the concentration thereof, will be different between one mixture and the other, in order to achieve a sufficient contrast between the wide veins and the base material of the artificial stone.

Other additives can also be added to any of the mixtures, such as accelerators for the curing or promoters for the adhesion between the filler and the resin (for example, but not limited to, silanes). These types of additives and the proportion used thereof are known in the state of the art, and any of them can be incorporated into the present invention.

The surface (1), on which the template (2) is positioned, is preferably a horizontal surface, which will normally be part of the industrial production line of the slabs, tiles or sheets. This surface (1) together with the template (2) and the frame (21) optionally comprised in the template (as a single body and/or as an element separated from the rest of it), make up a mould containing the first mixture (3) discharged by the first distributor. The surface (1), advantageously, comprises in the portion that will come into contact with the first and/or second mixture, a sheet of Kraft paper or elastomer, for example an elastomer made of EPDM, silicon or neoprene. This Kraft paper or elastomer can be used as a temporary support in order to advance the mixture deposited thereon to subsequent steps of the productive process, accompanying the mixture during the compaction and the hardening. Once the slab, tile or sheet has hardened, the sheet of paper or elastomer is removed by unsticking it or by means of calibrating and polishing.

It is envisaged in the invention that the template (2) can be made from several separate elements, which are positioned on the surface (1) simultaneously or separately. As indicated, the template (2) used, according to a particular embodiment, will comprise (as a single body or as a separate element from the rest of the template) a frame (21) which will have, at least, the shape and size of the slab or tile that is to be obtained. The frame (21) will preferably have vertical walls to accommodate the first mixture (3) on the surface (1), by way of mould. Generally, the length and width of the frame (21) will be somewhat larger than that of the slab, tile or sheet to be manufactured, in order to compensate for the contraction that is produced during the compaction and hardening phases, and in order to enable a more exact cutting of the final article, as well as to enable the final calibrating and polishing, which will improve the qualities and the final aesthetic appearance of the obtained slab or tile. On several occasions, but not necessarily, it will be a rectangular frame (21) that is tall enough to accommodate enough material to obtain, after the compaction of the mixtures and the hardening thereof, a slab, tile or sheet of the desired thickness or greater. As indicated, according to particular embodiments, the frame (21) can be made up of, alternatively or additionally, an element physically separated from the rest of the template, which can be positioned on the surface before, after or at the same time as the rest of the template. In fact, this embodiment is preferred.

Both the template (2) and the frame (21) optionally comprised therein (as a single body or as an element separate from the rest of the template), will be manufactured from a material that is sufficiently resistant to the attack of the components of the composition of any of the 2 mixtures used (mainly styrene vapours if a polyester resin is used), preferably stainless steel or polyamide, or they will be coated with materials resistant to said mixtures, for example with Kraft paper or an elastomer, in a manner similar to the temporary support preferably comprised in the surface (1).

The template (2) is designed in correspondence with the shape and the size of the slab, tile or sheet of artificial stone to be produced. Normally, this template (2) will comprise a frame (21) with vertical walls, wherein the gaps (23) and islands (22) are accommodated. The template (2) and the frame (21) optionally comprised therein, will usually have a rectangular shape, favourably with a length of at least 2 metres, preferably at least 2.5 metres and a width of at least 0.8 metres, preferably at least 1 metre. The vertical walls of the frame (21) will preferably have a total height suitable to accommodate the amount and the volume of the first mixture (3) necessary to obtain the desired thickness of the article made of artificial stone after the compaction, hardening and finishing thereof. The total thickness of the frame (21) is at least 5 cm, preferably between 5 and 30 cm. The islands (22) (or branches) present in the template (2) preferably have an irregular and apparently random shape, which tries to simulate the shape of the veins found in natural stones. Therefore, these islands (22) frequently vary in the dimensions thereof throughout the extension and throughout the thickness thereof, and can be isolated from each other, or linked to each other, simulating the nature of the veins found in natural stone. The height of said islands (22) (or branches) will be preferably greater than or equal to the height of the vertical walls of the frame (21).

Figure 3:
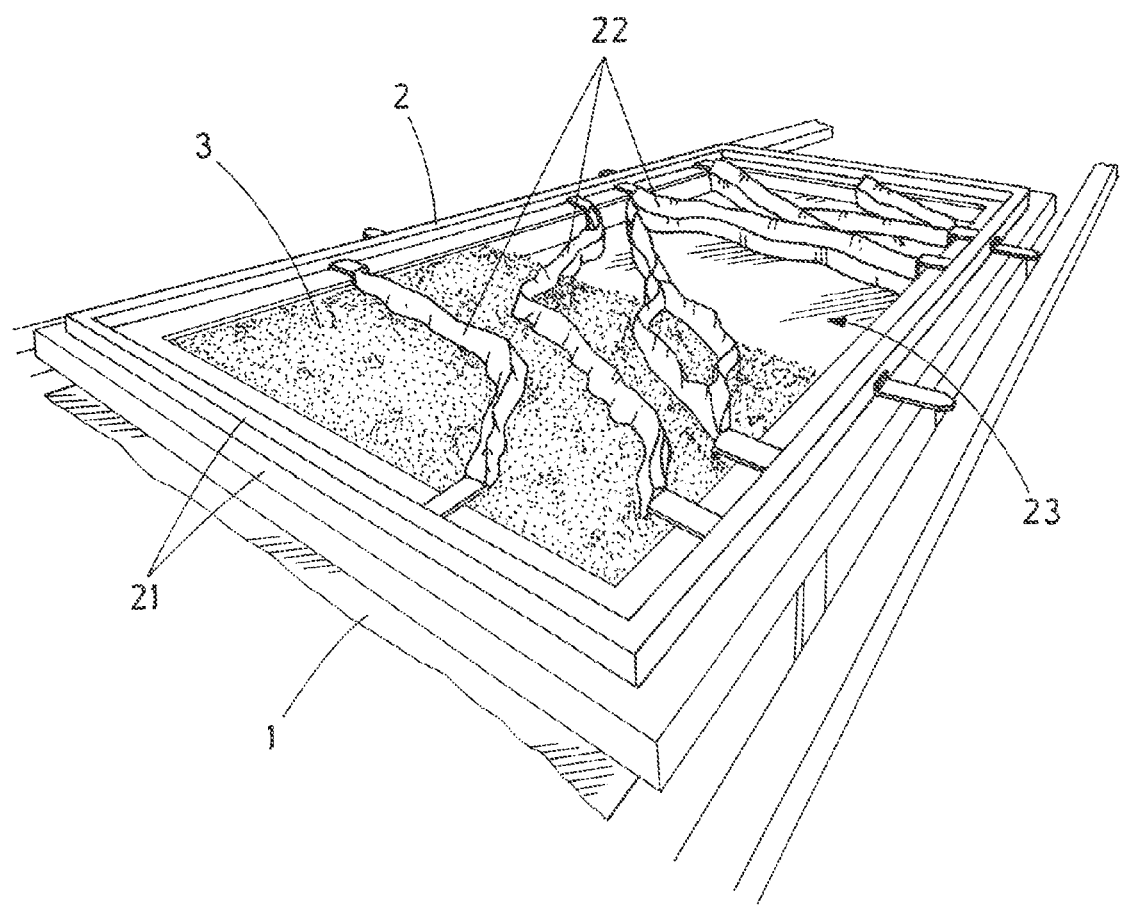
FIG. 3—Assembled perspective view of the elements of the method of the invention, corresponding to step b), wherein the gaps (23) of the template (2) positioned on the surface (1) have been partially filled with the first mixture (3) from a first distributor (not shown): surface (1) with optional Kraft paper, template (2) with optional frame (21), islands (22) of the template (2), gaps (23) of the template (2) and first mixture (3) (dotted areas show the gaps already filled with the first mixture (3))

In order to discharge the first mixture (3) onto the surface (1) with the template (2) positioned thereon, said first mixture (3) is transported from a mixer, through conveyor belts, to a distributor, which for purposes of clarity and in order to differentiate it from the distributor device of the system for filling the cavities (5) (second distributor device), it is herein called first distributor device; said first distributor device homogeneously discharges the first mixture (3) onto the template (2) positioned on the surface (1). The first mixture (3) falls from the first distributor device into the gaps (23) left by the template (2), resting on the surface (1), and filling at least partially the gaps (23), until reaching the desired thickness. FIG. 3 shows the situation wherein approximately half the template (2) has been filled with the first mixture (3). Preferably, the filling level of all the gaps (23) is similar and homogeneous. This discharging with the first distributor device is performed conventionally, with control of the discharged amount of the first mixture (3), and by means of techniques widely known in the art for these types of materials and methods. After this step, the first mixture (3) is retained inside the gaps (23) of the template (2), between the islands (22) (or branches) and the frame (21) of the template (2), and deposited onto the surface (1).

Figure 5:
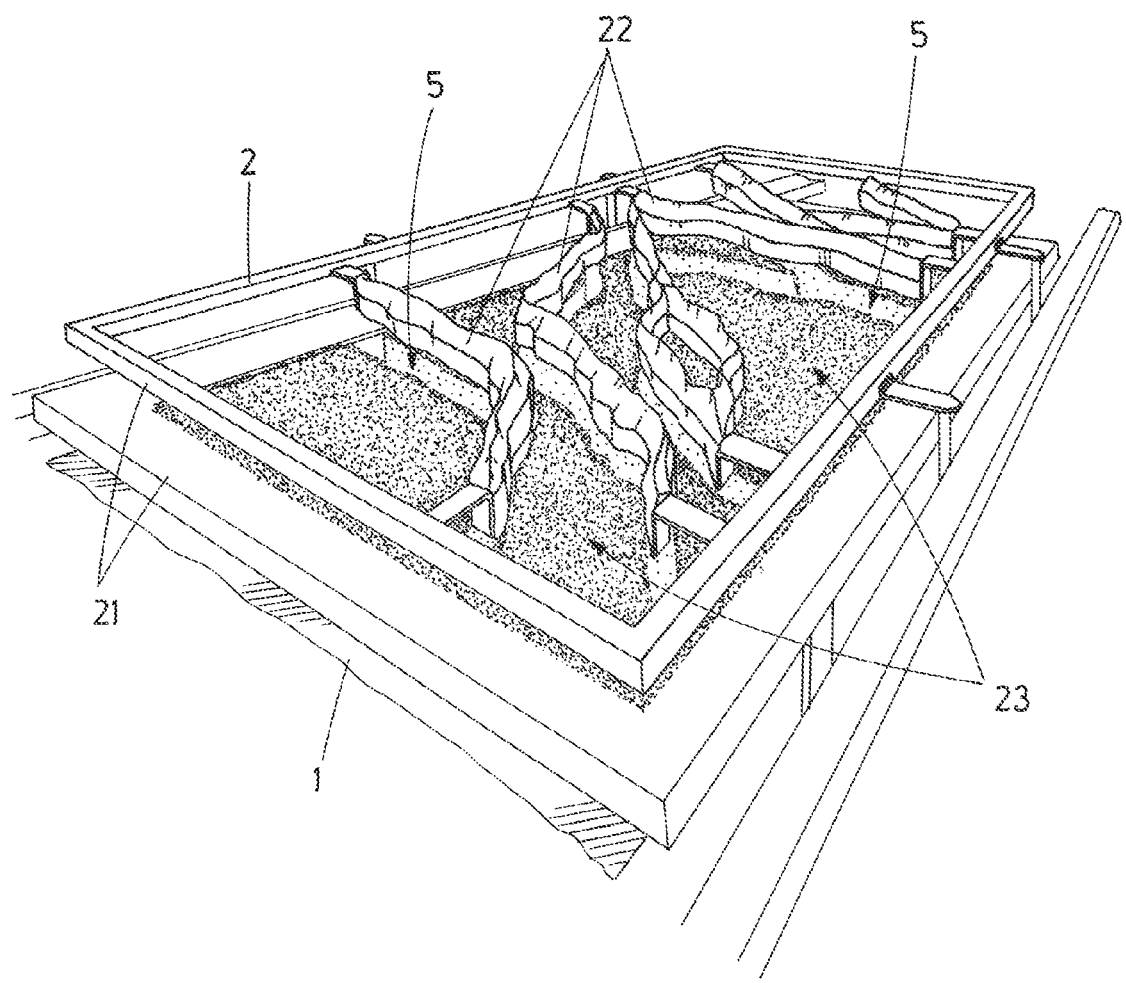
FIG. 5—Perspective view of the elements of the method of the invention, in step c) corresponding to the removal of the islands (22) from the template (2), once the gaps (23) of the template (2) have been filled with the first mixture (3) (areas with more intense dotting). The cavities (5) left when the islands (22) are removed from the template (2) and in correspondence with them (areas with less intense dotting) can be seen.

Subsequently, and as seen in FIG. 5, the template (2) is removed from its position on the surface (1), preferably by means of elevation, a layer of the first mixture (3) staying on said surface (1), with cavities (5) (or gaps) where the islands (22) (or branches) of the template (2) were positioned. Due to the binder content of the first mixture (3), it has a certain coherence and stickiness, which makes it so the cavities (5) do not close when the template (2) is removed.

Figure 6:
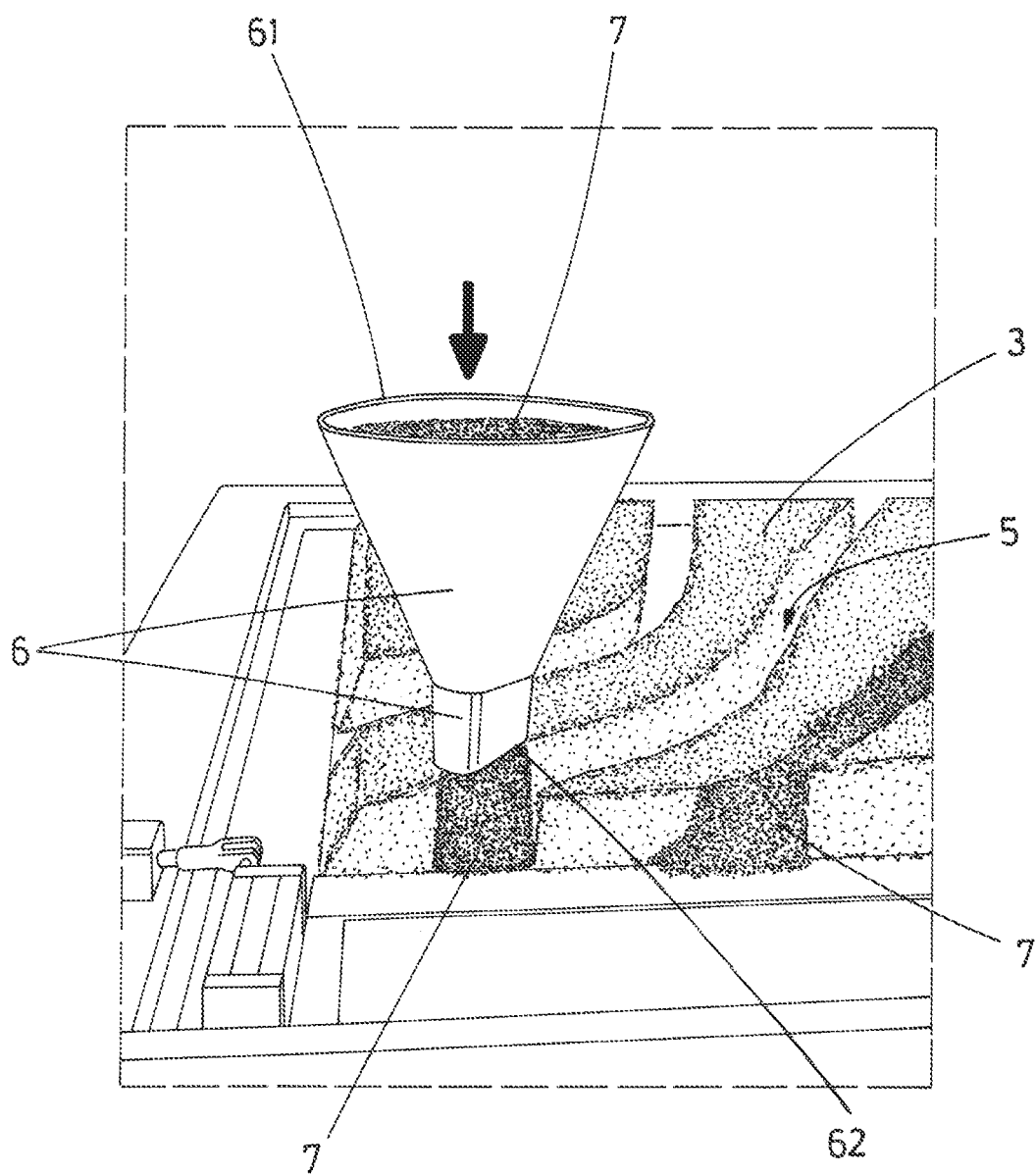
FIG. 6—Detailed view corresponding to step d) of the method of the invention, of filling the cavities (5) with the second mixture (7) by means of the movement of the collector (6) along the cavities (5); the second mixture (7) is introduced through the top opening (61) of the collector (6) and falls through the bottom opening (62) of the collector (6) inside the cavities (5).

Then the filling step of the cavities (5) begins, wherein a second mixture (7) is then discharged, which also comprises inorganic particles and an unhardened binder, in order to fill at least a portion of the cavities (5) in the layer of the first mixture (3) with said second mixture (7). As shown in FIG. 6, this discharging is carried out in a localised manner on the cavities (5) in the layer of the first mixture (3), by means of a second distributor device, which comprises a collector (6), the bottom opening (62) of which has, in at least one direction, a width (d) less than or equal to the maximum width of the cavities (5); said second distributor device moves along at least a portion of the cavities (5), preferably along all the cavities (5), filling at least partially, preferably at least 50%, said cavities (5) with the second mixture (7). Thus, the discharging of the second mixture (7) is directly produced inside the cavities (5), without shrinkage of material and barely any contamination of the portions of the first mixture (3). As the discharging of the second mixture (7) is localised in the cavities (5), it can be achieved that the discharging of the second mixture (7) is produced from a small distance, i.e. very close to the cavity (5), and in this manner further obtaining, in the artificial stone produced at the end, a greater definition of the veins, since not as much dispersion of the second mixture (7) is produced in the walls of the cavities (5) by discharging from a greater height.

With the characteristic of the width (d) of the bottom opening (62) of the collector (6) being less than or equal, in some direction, to the maximum width of the cavities (5), the effect is achieved of practically all the discharged mixture falling into the cavities (5).

Figure 10:
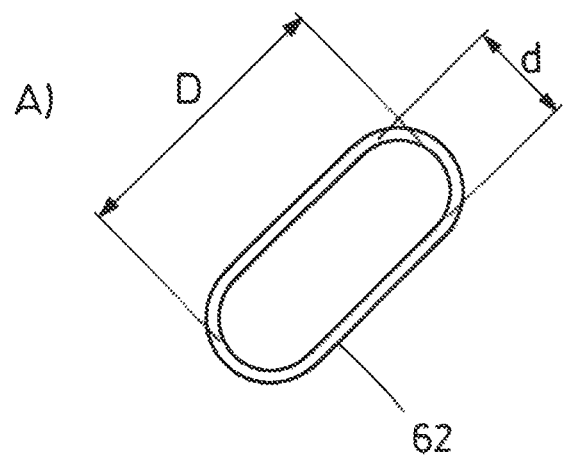
FIG. 10—Projections of possible shapes of the bottom opening (62) of the collector (6) on the plane perpendicular to the discharging direction (vertical direction), in order to illustrate the significance of the minor width (d) and the major width (D). The shape is not necessarily limited to what is indicated in FIGS. 10A and 10B.
Figure 10:
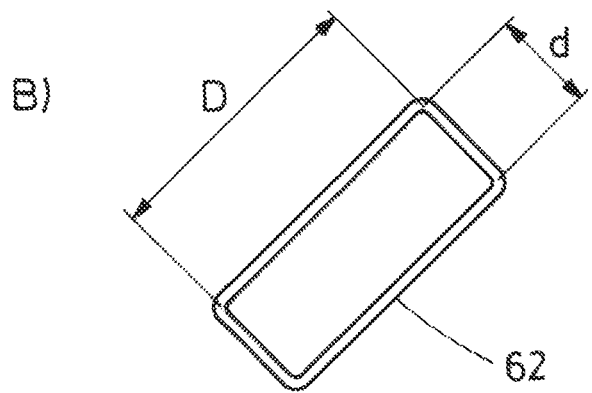

By "width" (d) of the bottom opening (62) of the collector (6) the most common meaning is understood, in other words, the shortest distance through the geometric centre between two opposing points in the inner portion of that opening (62), distance measured in the two-dimensional projection in a plane perpendicular to the discharging direction through that opening (62), Thus, for example, if the opening (62) is configured as a rectangle, and the mixture is discharged vertically through it, the minor width (d) of the opening (62) will be the length of the smallest side of the rectangle formed by the projection of the opening on a horizontal plane. In another example, if the opening (62) is configured as tilted (not horizontal) and as an ellipse, through which the mixture is discharged vertically, the minor width (d) of the opening will be the smaller diameter of the ellipse made up by the projection of the opening (62) on a horizontal plane. Preferably, the minor width (d) of the bottom opening (62) of the collector (6) will be less than or equal to 100 mm, or is comprised in a range from 20-80 mm, and more preferably between 30-70 mm. FIG. 10 shows, by way of example and by way of illustration, projections on a horizontal plane (XY) of options for the bottom opening (62) of the collector (6) shown in FIGS. 6-8, showing a minor width (d) and a major width (0).

The width of the cavities (5) is understood as the distance between two points facing each other, opposite in a direction perpendicular to the direction followed by the cavity (5) located in the walls that make up the cavities (5) obtained in the layer of the first mixture (3) when the template (2) is removed. The maximum width relates to the maximum distance between two pairs of those points facing each other, considering all the regions of all the cavities (5) produced by that template (2). The maximum width of the cavities (5), in a preferred manner, will be greater than 10 mm, or between 10-200 mm, and more preferably between 20-150 mm.

According to a preferred embodiment, the second distributor device is assembled in a robotic device that moves said second distributor device along the cavities (5), preferably in a selective manner, and discharges different amounts of the second mixture (7) in different regions of the cavities (5), according to the width of said cavities (5) in those regions. The different discharged amounts of the second mixture (7) are controlled by means of the discharging speed of the second distributor device in the respective region of the cavities that are being filled, or by means of the movement speed of the robotic device, depending on the respective region of the cavities that are being filled. Thus, the robotic device may be programmed to follow the irregular and apparently random shapes of the cavities (5) created by the islands (22) of the template (2) in the layer of the first mixture (3), positioning the second distributor device such that it discharges the second mixture (7) mostly inside the cavities (5). According to a preferred embodiment of the invention, the filling system is designed and adapted to discharge different amounts of the second mixture (7) in different regions of the cavities (5). At the same time as the robotic device moves the second distributor device throughout the cavities (5), the distributor device discharges different amounts of the second mixture (7) into different regions of the cavities (5). In other words, the amount of the discharged second mixture (7) can be adjusted to the volume to be filled that the cavity (5) has in the specific region being filled, region wherein the robotic device positions the distributor device. Preferably, there is a link between the robotic device and the distributor device, which enables the synchronisation between them, such that the discharged amount of the second mixture (7) on the cavities (5) varies according to the position of the robotic device, depending on the width of the cavity (5) in said position. This link can be made through a computer system, through instructions given, for example, by programming.

Figure 7:
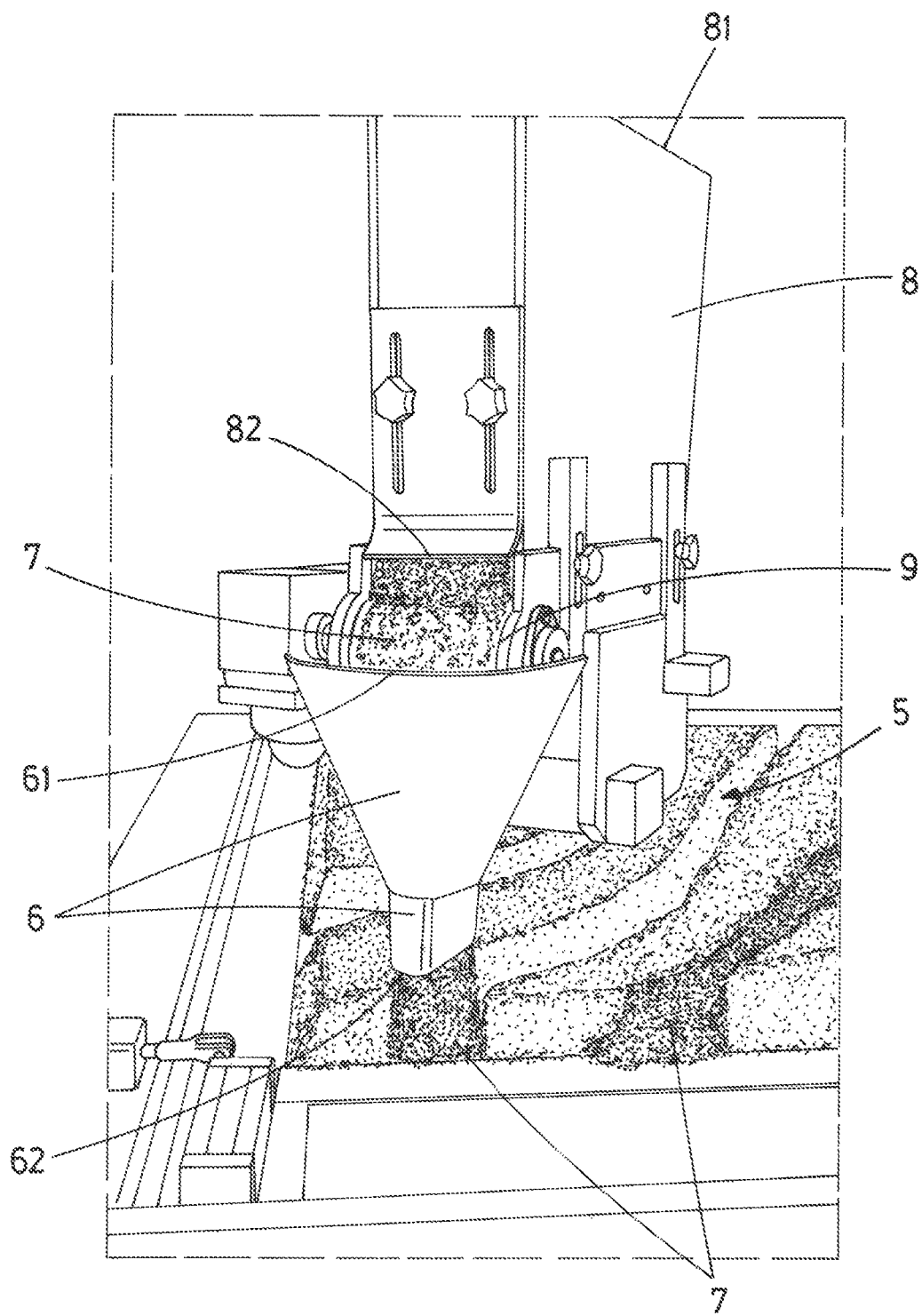
FIG. 7—Detailed view of the filling system according to a possible embodiment of the invention, assembled in a robotic device (not shown); filling the cavities (5) with the second mixture (7) or filling mixture; the second mixture (7) or filling mixture is introduced into the hopper (8) through the top opening thereof (81), which falls on a conveyor belt (9), which discharges the second mixture (7) into the collector (6) which starts to discharge the second mixture (7) into the cavities (5) in a localised manner. As a result, a layer of material is obtained, being a combination of first and second mixtures.
Figure 8:
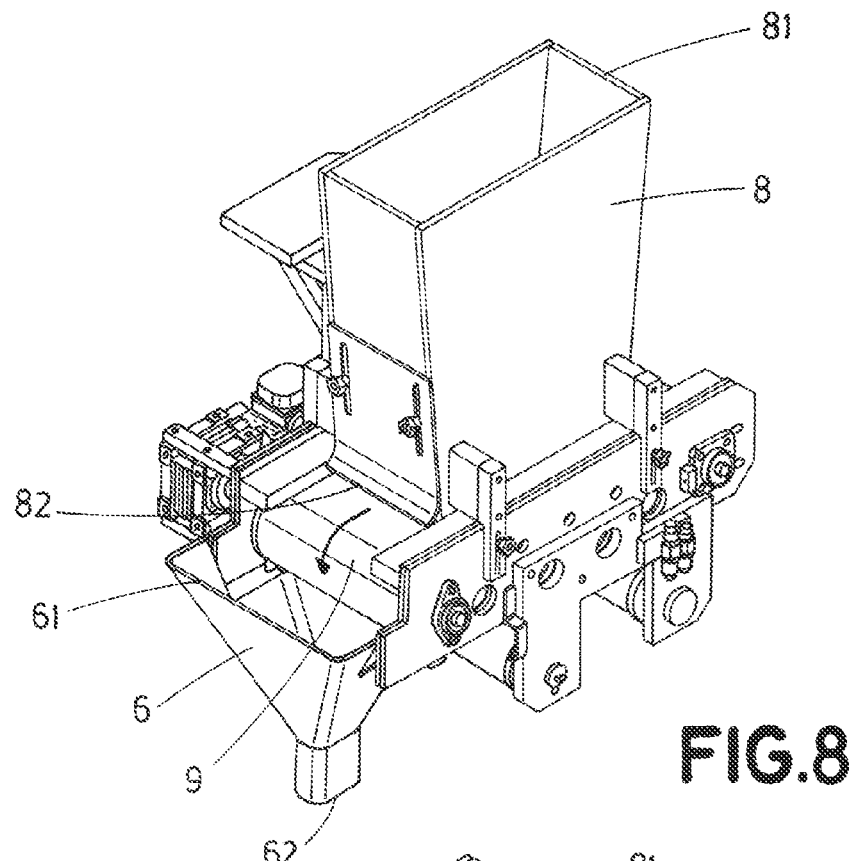
FIGS. 8 and 9—Detailed view of the elements of a possible embodiment of the system according to one aspect of the invention, adapted to be assembled in a robotic device (not shown): hopper (8), top opening (81) of the hopper (8), conveyor belt (9), collector (6), top opening of the collector (61) and bottom opening (62) of the collector (6).
Figure 9:
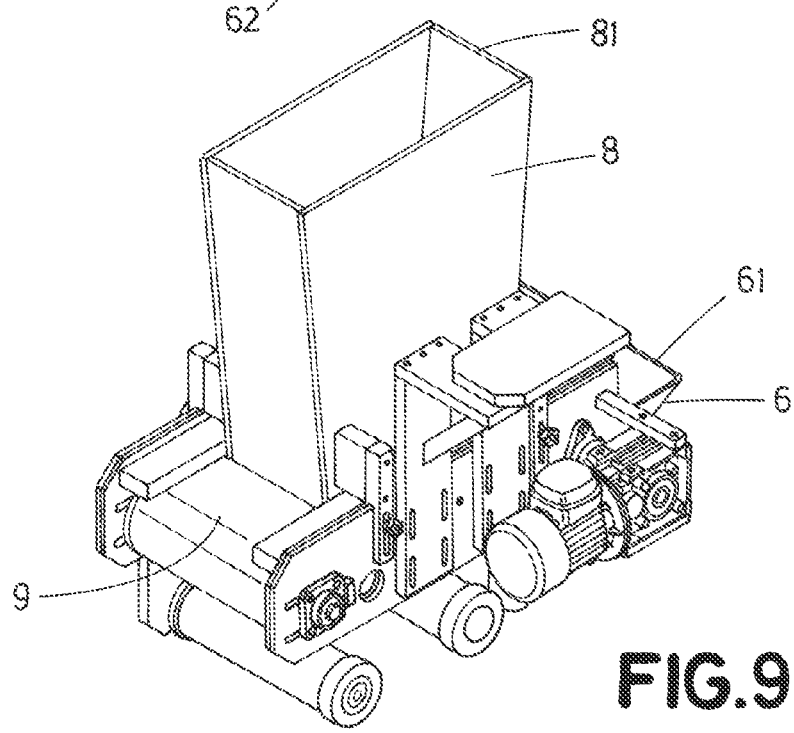

As seen in FIGS. 7-9, said second distributor device for filling of the cavities (5) can comprise, preferably, a conveyor belt (9) for the second mixture (7), above the collector (6). This conveyor belt (9) can be, for example, an "endless" conveyor belt, which moves by making a closed path over the outside of two or more cylinders, having an outbound path along the upper portion and a return path along the lower portion. The second mixture (7) is deposited on the belt (9), and moves simultaneously with it, and upon arriving at the portion wherein the belt turns to go back, is discharged through the top opening (61) of the collector (6), which directs the second mixture (7) towards the cavities (5) through the bottom opening thereof (62).

In a particular embodiment, the speed of the conveyor belt (9) is maintained constant, thereby producing a constant discharging speed of the second mixture (7), while the movement speed of the robotic device varies throughout the cavities (5), producing variations in the amount discharged in different regions of the cavities (5): a smaller amount where the movement of the robotic device is faster, and a bigger amount where the movement is slower. Alternatively, the speed of the movement of the robotic device can be maintained constant throughout the cavities (5), while the speed of the conveyor belt (9) varies throughout the movement along the different regions of the cavities (5). In this case, the discharged amount of second mixture (7) in a region of the cavities (5) will be greater if the speed of the conveyor belt (9) is faster.

The speed of the conveyor belt (9), the speed of the robotic device, and the position of the robotic device are preferably controlled by means of a computer processing system, and the instructions preferably given through programming.

The preferred embodiment of the invention wherein the distribution device of the second mixture (7) comprises a conveyor belt (9), removes the limitations that other known material projection systems have, as far as the fluidity required of the mixture used to fill. Thus, when the distributor device is based on the use of a conveyor belt (9), as the second mixture (7), mixtures that are made up of aggregates of binder with inorganic filler with high particle content with a granulometry >0.75 mm can be used, this way, these mixtures can be used to fill the cavities (5) that will define wide veins, without problems of the distributor being obstructed or the mixtures not being able to be projected, such as the case, for example, of the system described in EP3095768A1 for obtaining fine veins in artificial stone. Thus, in a particular embodiment of the invention, the second mixture (7) discharged in step e) comprises at least 50%, preferably at least 65%, and more preferably between 70-95% by weight of the total mixture of inorganic particles with a granulometry above 0.75 mm.

The method, in foreseen embodiments of the invention, foresees that the robotic device carries the second distribution device to a reloading position, wherein the discharged amount of the second mixture (7) is replenished from the corresponding mixer, transported by means of a belt. The distributor device, according to a particular embodiment, comprises a filling level sensor, which indicates when it is necessary for the robotic device to proceed to the reloading position.

Figure 4:
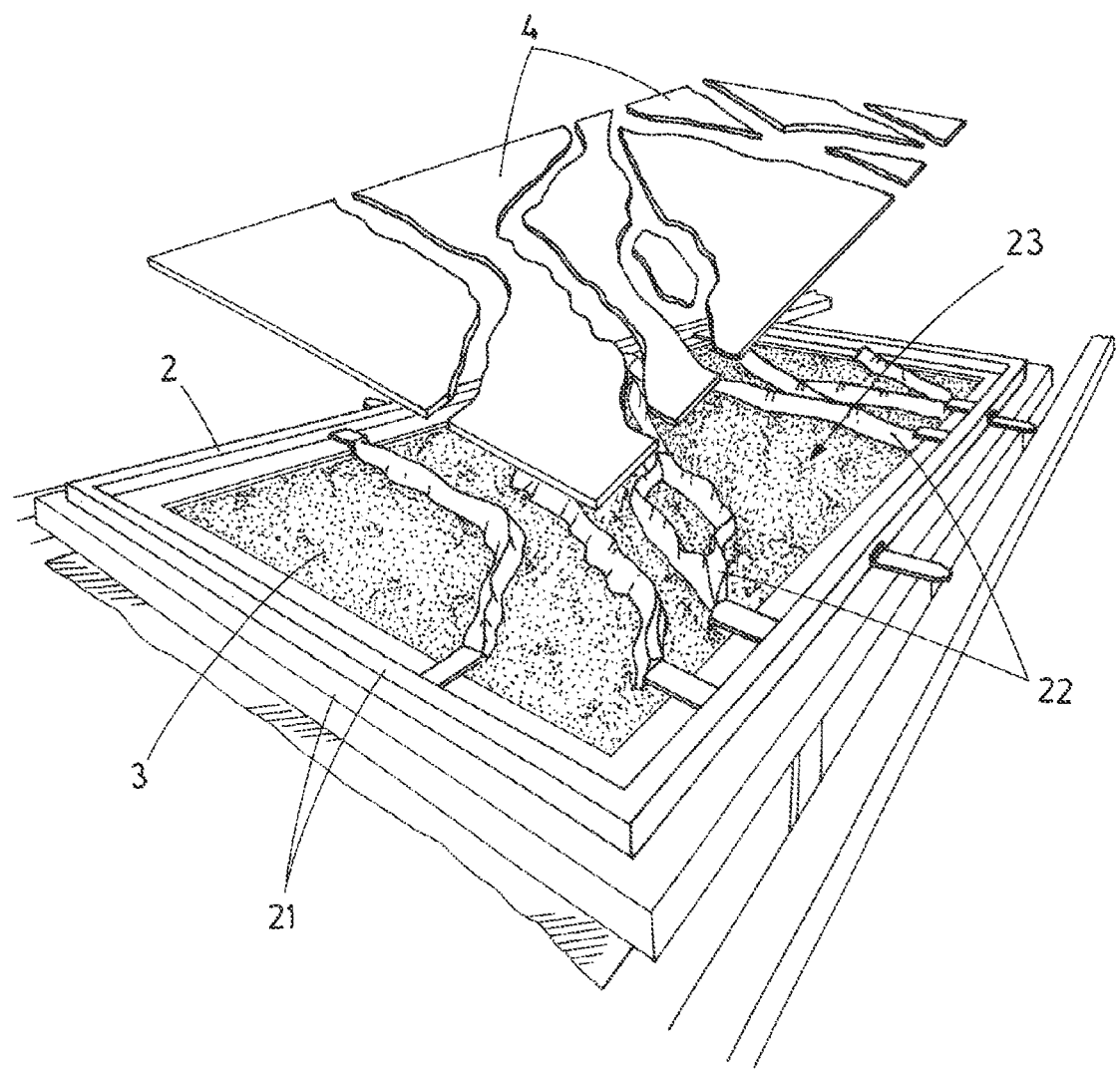
FIG. 4—Assembled perspective view of the elements of the method of the invention: surface (1) with optional Kraft paper, template (2) with optional frame (21), islands (22) of the template (2), and gaps (23) of the template (2) already filled with the first mixture (3) (dotted areas), with exploded perspective of the compactor (4) with a shape complementary to the template shape (3), used in the optional pre-compaction step b1).

According to a particular embodiment, after step b) of discharging and before step c) of removing the template (2), a pre-compaction step b1) is carried out; in said step, the contents of the gaps (23) left by the template (2) are then compacted, meaning the gaps (23) wherein the first mixture (3) is found, by means of a compactor (4), which preferably comprises a sheet complementary to the template (2), which presses the layer of the first mixture (3) against the surface (1). As seen in FIG. 4, with a sheet complementary to the template (2) it indicates that it is a sheet with solid portions and gaps between them, in a manner complementary to the template (2) used, that is, it has solid portions wherein the template has gaps (23), and it has gaps wherein the template (2) has islands (22) (or branches), only pressing on the areas that contain the first mixture (3). The compactor (4) will exert pressure on the first mixture (3) that is enough to reach the desired level of compaction of that first mixture (3). The pressure exerted by the compactor (4) will be at least 0.5 kPa, preferably at least 1 kPa, and more preferably between 1,5-3.0 kPa.

Upon applying pressure on the first mixture (3), the aggregates that make it up are compacted against the surface (1) and against the islands (22) in the template (2), removing a portion of the air comprised between them, and generating cavities (5) with more compact and stable walls when the template (2) is removed. This effect reduces the possibility of the components of the first mixture (3) and the second mixture (7) mixing together in the walls of the cavities (5), during the step of filling the cavities (5).

Alternatively, or additionally to step b1) of pre-compaction, an additional step c1) of defining the profile can be carried out, after step c) of removing the template (2) and before step d) of discharging the second mixture (7); in this step, a profiling mixture is applied, which comprises unhardened binder (or resin), onto the walls of the cavities (5) in the layer of the first mixture (3). The binder or mixture of binders that this mixture contains can be the same or different as the binder or binders used in the first (3) and second (7) mixtures. According to another particular embodiment, the profiling mixture can exclusively contain organic resin or organic resins. According to another embodiment, it can additionally contain a colourant or pigment or a mixture of colourants and/or pigments; this pigment, colourant or the mixtures thereof can be the same as the colourant used in one of the two mixtures, first (3) or second mixture (7), or it can be different. Preferably it will be a dark pigment or colour. This profiling mixture achieves an even greater definition of the vein in the artificial stone, since once applied it acts as a separation layer between the first mixture (3) and the second mixture (7) during the filling of the cavities (5). In the case of a dark pigment, the wide vein effect generated will be even more realistic, that is, more similar to the appearance the veins have in natural stone. The profiling mixture can likewise contain small inorganic particles, for example micronised quartz or silica, or other additives such as catalysts, adhesion promoters, etc. The profiling mixture is applied or projected onto the surface of the walls of the cavities (5) obtained in the layer of the first mixture (3). The profiling mixture, for example, can be projected by means of an atomising head situated on the end of a robotic arm, which moves along the cavities (5).

Surprisingly, apart from the aesthetic effects, by applying this profiling mixture, after the hardening of the applied binder mixture, the profiling mixture improves the definition of the veins and reinforces the mechanical strength of the joint between the substrate mixture (or first mixture (3)) and the filling mixture (second mixture (7)), reducing the fragility of the artificial stones obtained in the interface between the two mixtures. As previously indicated, the profiling step can be carried out after filling the gaps (23) of the template (2) and removing it, but before filling the cavities (5) left by the template (2) in the first mixture (3) with the second mixture (7), or after filling the gaps (23) of the template (2) and pre-compacting the first mixture (3) with the compactor (4), but before filling the cavities (5) left by the template (2) in the first mixture (3) with the second mixture (7).

The islands (22) of the template (2) will have a length, a width and a height. These islands (22), according to a particular embodiment, and as shown in FIGS. 1-5, will be configured, at least partially, with a shape that prevents the first mixture (3) from accumulating thereon during the discharging in step b). There are different possible ways of arriving at this configuration.

Thus, according to particular embodiments, the islands (22) of the template (2) are configured, at least partially, on the upper portion thereof (which receives the discharge of the first mixture (3)) in the shape of a ridge or it has a top protection in the shape of a ridge. This embodiment is precisely the one shown in FIGS. 1-5. Thus, the discharged material of the first mixture (3) slides along the sides of the ridge and falls into the gaps (23) of the template (2), without being retained on the islands (22).

Alternatively or additionally, the walls of the islands (22) can be, at least partially, configured with a tilted shape (not vertical), such that the islands (22) have a larger width in the portion closer to the surface (1) than in the upper portion of the template (2). This way the discharged material slides along that slope and/or ridge to the gaps (23) and does not stay accumulated on the islands (22) (or branches).

The resulting layer of the combination of the first (3) and second (7) mixtures is then subjected to step e), wherein it is compacted. Different forms of compaction are possible. Preferably, this compaction is performed through a press, and more preferably in combination with vibration, through the process known as vibro-compaction. Additionally, or alternatively to the vibro-compaction, the compaction can be done by extracting the air contained in the layer, by means of applying a vacuum. The vacuum vibro-compaction, suitable for the present invention, is a method widely known in the art and is frequently used for manufacturing articles of aggregate materials made of inorganic particles or ceramics. In this vacuum vibro-compaction process, the resulting layer of the combination of the first (3) and second (7) mixtures is introduced into a sealed chamber made up of the punch and the surface of a press. During the pressing, the sealed chamber is emptied while vibrating devices subject the mixture to an intense vibration.

After the compaction, it is proceeded to harden the binder in the compacted layer. In order to do so, in the cases wherein the binder is an organic resin, this layer is introduced into an oven at a sufficiently high temperature in order to produce the curing thereof in a reasonable amount of time. For catalyzed, unsaturated polyesther organic resins, usually used, the temperature will be in the range of 80-110° C. and the residence times will be between 15-60 minutes. For inorganic binders, like hydraulic cement, it is also foreseen that the curing can be carried out at room temperature for a period of one to several days.

The slabs, tiles or sheets obtained can be cut and/or calibrated to the final dimensions desired, and they can be polished on one or both major faces, depending on the application they are intended for.

The present invention also refers to any slab, tile or sheet obtained by means of the previously detailed method, and to the use thereof as material for construction or decoration.

According to additional aspects, the present invention also refers to a method for manufacturing slabs, tiles or sheets of artificial stone with a vein effect, preferably wide veins, which comprises the following steps:

a) a template (2) is positioned on a surface (1), the template comprising gaps (23) and islands (22), preferably irregular, which correspond to at least one vein of the article to be manufactured;

b) a first mixture (3) is discharged, which comprises inorganic particles and an unhardened binder, onto the template (2), by means of a first distributor device, such that said first mixture (3) rests on the surface (1) and fills the gaps (23) of the template (2);

c) the template (2) is removed, obtaining a layer of the first mixture (3) with cavities (5) in said layer, defined by the positions of the islands (22) of the d) a second mixture (7) is discharged, which comprises inorganic particles and an unhardened binder, in order to fill at least a portion of the cavities (5) in the layer of the first mixture (3) with said second mixture (7);

e) the resulting layer of the combination of first (3) and second (7) mixtures is compacted, preferably by vibration and/or compaction and/or vacuum, and a hardening process is carried out, in order to obtain the slab, tile or sheet of artificial stone with a vein effect, preferably wide veins;

characterised in that it comprises, additionally, one or both of the following steps:

b1) pre-compacting step, after step c) of discharging and before step d) of removing the template (2), wherein the contents of the gaps (23) left by the template (2) are compacted by means of a compactor (4), which preferably comprises a sheet complementary to the template (2), which presses the layer of the first mixture (3) against the surface (1); and/or c1) profiling step, after step d) of removing the template (2) and before step e) of discharging the second mixture (7), wherein a profiling mixture is applied comprising unhardened binder, onto the walls of the cavities (5) in the layer of the first mixture (3).

For steps a), b), b1), c), c1), d), and e), particularly 131) and c1), all the features, definitions and particular or preferred embodiments previously described in the present description are applicable.

According to another additional aspect of the invention, the present invention also refers to a method for manufacturing slabs, tiles or sheets of artificial stone with a wide vein effect, which comprises the following steps:

a) a template (2) is positioned on a surface (1), a template (2) which comprises gaps (23) and islands (22), preferably irregular, which correspond to at least one vein of the article to be manufactured;

b) a first mixture (3) is discharged, which comprises inorganic particles and an unhardened binder, onto the template (2), by means of a first distributor device, such that said first mixture (3) rests on the surface (1) and fills the gaps (23) of the template (2);

c) the template (2) is removed, obtaining a layer of the first mixture (3) with cavities (5) in said layer, defined by the positions of the islands (22) of the d) a second mixture (7) is discharged, which comprises inorganic particles and an unhardened binder, in order to fill at least a portion of the cavities (5) in the layer of the first mixture (3) with said second mixture (7);

e) the resulting layer of the combination of first (3) and second (7) mixtures is compacted, preferably by vibration and/or compaction and/or vacuum, and a hardening process is carried out, in order to obtain the slab, tile or sheet of artificial stone with a vein effect, preferably wide veins;

characterised in that the islands (22) are, at least partially, configured with a shape that prevents the first mixture (3) from accumulating thereon during the discharging in step b). Preferably, the islands (22) will be configured in their upper portion with a ridge shape or a tilted shape, such that the islands (22) have a larger width in the portion closer to the surface (1) than in the upper portion of the template (2).

For steps a), b), c), d), and e) all the features, definitions and particular or preferred embodiments previously described in the present description are applicable. It is possible, additionally, to carry out one or both of steps b1) and c1) referred to previously. All the features, definitions and particular or preferred embodiments previously described in the present description for steps b1') and c1) are also applicable here.

The present invention also refers to any slab, tile or sheet obtained by means of any of the methods described in the present description, in any of the described embodiments, and to the use thereof as material for construction or decoration.

According to another additional aspect, the present invention refers to a system or device suitable for manufacturing a slab, tile or sheet of artificial stone with a wide vein effect, which fills, with a filling mixture that can comprise inorganic particles and unhardened binder, irregular cavities, present in a first substrate layer, a system comprising a distributor device assembled in a robotic device, characterised in that the distributor device comprises:

i. a hopper (8) for storing the filling mixture (7), which has a top opening (81) and another bottom one (82), ii. a conveyor belt (9) located underneath the bottom opening (82) of the hopper (8), and iii. a collector (6), with a top opening (61) and another bottom one (62), which collects the filling mixture (7) discharged from the conveyor belt (9) and deposits it in the cavities (5) to be filled of the substrate (3), the bottom opening (62) preferably having, in at least one direction, a width (d) less than or equal to the maximum width of the cavities (5) to be filled.

The system or device covered by the scope of the invention is particularly suitable for the cases where the filling mixture (7) comprises at least 50%, or at least 65%, or in the range of 70-95% by weight of the total mixture of inorganic particles with a granulometry above 0.75 mm.

According to a particular embodiment, the distributor device and the robotic device are linked, preferably by means of a computer system.

Preferably, said computer system serves to control the amount of filling mixture (7) deposited in the different regions of cavities (5), depending on the width in those different regions of the cavities (5) to be filled.

The system of the invention enables to use filling mixtures (7) with inorganic particles and unhardened binder, wherein those particles have a large particle size (i.e. larger than 0.75 mm), mixtures having high stickiness and a strong tendency to form aggregates and clump together. The discharging of the filling material can be controlled and is produced homogeneously, without producing blockages or irregular discharging.

This system or device is further able to discharge in a localised manner a filling mixture (7) on cavities (5) in the layer of a substrate (3), directly into the inside of the cavities (5), without shrinkage of material and barely any contamination of the portions of the substrate (3), so that, in the resulting artificial stone, a greater definition of the veins may be obtained.

The distributor device assembled on a robotic device can move, thanks to the robotic device, selectively along the cavities (5) of the substrate (3), and discharge different amounts of the filling mixture (7) (for example of inorganic particles and unhardened binder) in different regions of the cavities (5), according to the width and shape of said cavities (5). The different discharged amounts of the filling mixture (7) are controlled by means of the discharging speed of the second distributor device in the respective area of the cavities (5) that are being filled, or by means of the movement speed of the robotic device, depending on the respective area of the cavities (5) that are being filled. The robotic device can be an anthropomorphic robotic arm or a cartesian coordinate robot, and be programmed so that it selectively follows the irregular and apparently random shapes of the cavities (5) in the substrate layer (3), positioning the distributor device such that it discharges the filling mixture (7) mostly inside the cavities (5).

According to a preferred embodiment of the invention, the system for filling cavities (5) is designed and adapted to discharge different amounts of the filling mixture (7) (for example of inorganic particles and unhardened binder) in different regions of the cavities (5). At the same time as the robotic device moves the distributor device along the cavities (5), the distributor device discharges different amounts of filling mixture (7) into different regions of the cavities (5). In other words, the amount of discharged filling mixture (7) can be adjusted to the volume to be filled that the cavity (5) has in the specific region being filled, region wherein the robotic device positions the distributor device. Preferably, there is a link between the robotic device and the distributor device, which enables the synchronisation between them, such that the discharged amount of filling mixture (7) on the cavities (5) varies according to the position of the robotic device, depending on the width of the cavity (5) in said position. This link and synchronisation can be made through a computer system, and the instructions can be given through programming.

The conveyor belt (9) for the filling mixture (7) (for example inorganic particles and unhardened binder) of the second distributor device, located above the collector (6) and underneath the hopper (8), can be, for example, an "endless" conveyor belt, which moves by making a closed path over the outside of two or more cylinders, having an outbound path along the upper portion and a return path along the lower portion. The filling mixture (7) is deposited on the belt (9), and moves simultaneously with it, and upon arriving at the portion where the belt turns to go back, is discharged through the upper opening (61) of the collector (6), which directs the filling mixture (7) towards the cavities (5) through the bottom opening thereof (62).

In a particular embodiment, the speed of the conveyor belt (9) of the second distributor device is maintained constant, thereby producing a constant discharging speed of the filling mixture (7) (inorganic particles and unhardened binder), while the movement speed of the robotic device varies throughout the cavities (5), producing variations in the amount discharged in different regions of the cavities (5): a smaller amount wherein the movement of the robotic device is faster, and a bigger amount where the movement is slower. Alternatively, the speed of the movement of the robotic device can be maintained constant throughout the cavities (5), while the speed of the conveyor belt (9) is varied along the movement over the different regions of the cavities (5). In this case, the discharged amount of filling mixture (7) (inorganic particles and unhardened binder) in a region of the cavities (5) will be greater if the speed of the conveyor belt (9) is faster.

The speed of the conveyor belt (9) of the second distributor device, the speed of the robotic device, and the position of the robotic device are preferably controlled and/or synchronised by means of a computer processing system, and the instructions preferably given through programming.

This device or system comprising a conveyor belt (9) in the second distributor device eliminates the limitations that other known material projection systems have (see, for example, EP3095768A1) regarding the fluidity required of the mixture used to fill. Thus, when the second distributor device is based on the use of a conveyor belt (9), mixtures can be used, as filling mixtures (7), that are made of aggregates of liquid, uncured resin, with an inorganic filler with high content, for example more than 50% by weight, or more than 60% by weight, or between 70-95% by weight over the total mixture, of particles with a granulometry of >0.75 mm; in this way, these problematic mixtures can be used to fill, in a manner that is homogeneous, controlled and reproducible, the gaps that will define wide veins, without problems of the distributor being obstructed or the mixtures not being able to be projected, such as the case, for example, of the system described in EP3095768A1 for obtaining fine veins in artificial stone.

In foreseen embodiments of the invention, it is envisaged that the robotic device carries the second distribution device to a reloading position, where the discharged amount of filling mixture (7) (inorganic particles and unhardened binder) is replenished in the hopper (8) from the corresponding mixer, transported by means of a belt. The device or system, according to another particular embodiment, compatible with the prior embodiments, comprises a filling level sensor of the hopper (8), which indicates when it is necessary for the robotic device to proceed to the reloading position.

The invention claimed is:

1. A system for manufacturing slabs, tiles or sheets of artificial stone with a vein effect, the system comprising a distributor device arranged on a robotic device,
   wherein the robotic device is configured to move the distributor device along at least a portion of an irregularly shaped cavity in a layer of a first mixture;
   wherein the distributor device comprises:
   i. a hopper for storing a second mixture, the hopper having a top opening and a bottom opening, and
   ii. a conveyor belt for transporting the second mixture, the conveyor belt being located underneath the bottom opening of the hopper;
   wherein a computer system is configured to control the speed of the conveyor belt, the speed of the robotic device, and the position of the robotic device.

2. The system according to claim 1, wherein the distributor device comprises a bottom opening with a width less than or equal to a maximum width of the cavity.

3. The system according to claim 1, wherein the distributor device comprises a collector for collecting the second mixture discharged from the conveyor belt.

4. The system according to claim 1, wherein the cavity is one of a plurality of cavities; and
the computer system is configured to move the distributor device assembled on the robotic device selectively along the cavities while the distributor device discharges the second mixture.

5. The system according to claim 1, wherein the cavity is one of a plurality of cavities; and
the computer system is configured to move the distributor device assembled on the robotic device selectively along the cavities while the distributor device discharges different amounts of the second mixture in different regions of the cavities.

6. The system according to claim 1, wherein the computer system is configured to control the speed of the conveyor belt, the speed of the robotic device, and the position of the robotic device, so that the discharged amount of second mixture on the cavity varies according to the position of the robotic device.

7. The system according to claim 1, wherein the robotic device is an anthropomorphic robotic arm or a cartesian coordinate robot.

8. The system according to claim 7, wherein the computer system is configured to control the anthropomorphic robot arm or the cartesian coordinate robot to selectively follow the irregular shape of the cavity.

9. The system according to claim 1, wherein the system further comprises a reloading station where the robotic device can carry the distribution device to replenish the hopper with second mixture.

10. The system according to claim 9, wherein the hopper comprises a filling level sensor.

11. The system according to claim 1, wherein the first mixture comprises inorganic particles and unhardened binder and wherein the second mixture comprises inorganic particles and unhardened binder.

12. The system according to claim 11, wherein at least 50% by weight of the total mixture of inorganic particles in the second mixture have a granulometry above 0.75 mm.

13. The system according to claim 11, wherein at least 65% by weight of the total mixture of inorganic particles in the second mixture have a granulometry above 0.75 mm.

14. The system according to claim 1, wherein the system further comprises a template for creating the cavity in the first mixture layer.

15. The system according to claim 14, wherein the system further comprises a compactor.

16. The system according to claim 15, wherein the compactor comprises a sheet complementary to the template adapted for pressing the first mixture layer.

17. The system according to claim 1, wherein the system further comprises a press for vacuum vibro-compaction.

* * * * *